US008784511B2

United States Patent
Bouillon

(10) Patent No.: US 8,784,511 B2
(45) Date of Patent: Jul. 22, 2014

(54) METHOD FOR FORMING A THIN-FILM LITHIUM-ION BATTERY

(75) Inventor: Pierre Bouillon, Luynes (FR)

(73) Assignee: STMicroelectronics (Tours) SAS, Tours (FR)

( * ) Notice: Subject to any disclaimer, the term of this patent is extended or adjusted under 35 U.S.C. 154(b) by 586 days.

(21) Appl. No.: 12/877,344

(22) Filed: Sep. 8, 2010

(65) Prior Publication Data
US 2011/0076567 A1 Mar. 31, 2011

(30) Foreign Application Priority Data
Sep. 28, 2009 (FR) ..................................... 09 56676

(51) Int. Cl.
*H01M 10/04* (2006.01)
*H01M 4/04* (2006.01)

(52) U.S. Cl.
CPC .. *H01M 10/0436* (2013.01); *H01M 2010/0495* (2013.01); *H01M 4/0421* (2013.01)
USPC .......................................... 29/623.1; 429/162

(58) Field of Classification Search
None
See application file for complete search history.

(56) References Cited

U.S. PATENT DOCUMENTS

| | | | | |
|---|---|---|---|---|
| 5,807,165 | A * | 9/1998 | Uzoh et al. | 451/41 |
| 6,015,749 | A * | 1/2000 | Liu et al. | 438/628 |
| 6,264,709 | B1 | 7/2001 | Yoon et al. | |
| 6,417,093 | B1 * | 7/2002 | Xie et al. | 438/626 |
| 6,495,283 | B1 * | 12/2002 | Yoon et al. | 429/162 |
| 6,716,753 | B1 * | 4/2004 | Shue et al. | 438/687 |
| 6,822,778 | B2 * | 11/2004 | Westfall et al. | 359/265 |
| 7,144,655 | B2 * | 12/2006 | Jenson et al. | 429/162 |
| 7,413,289 | B2 * | 8/2008 | Cornell et al. | 347/63 |
| 7,939,195 | B2 * | 5/2011 | Salot et al. | 429/162 |
| 2002/0071989 | A1 * | 6/2002 | Verma et al. | 429/176 |
| 2003/0118897 | A1 * | 6/2003 | Mino et al. | 429/149 |
| 2003/0175585 | A1 * | 9/2003 | Ugaji et al. | 429/162 |
| 2004/0185336 | A1 * | 9/2004 | Ito et al. | 429/152 |
| 2004/0258984 | A1 * | 12/2004 | Ariel et al. | 429/152 |
| 2007/0172735 | A1 | 7/2007 | Hall et al. | |
| 2007/0226990 | A1 | 10/2007 | Morimoto | |
| 2008/0032236 | A1 * | 2/2008 | Wallace et al. | 430/319 |
| 2009/0214899 | A1 * | 8/2009 | Shakespeare et al. | 429/7 |

FOREIGN PATENT DOCUMENTS

DE 102008011523 A1 8/2009

OTHER PUBLICATIONS

Anup G. Roy et al., Effect of seed layers in improving the crystallographic texture of CoCrPt perpendicular recording media., May 15, 2002.*
L. Castoldi et al. "Copper-titanium thin film interaction", Microelectronic Engineering 76 (2004) 153-159.*
French Search Report dated Apr. 20, 2010 from corresponding French Application No. 09/56676.

* cited by examiner

*Primary Examiner* — Milton I Cano
*Assistant Examiner* — Wojciech Haske
(74) *Attorney, Agent, or Firm* — Wolf, Greenfield & Sacks, P.C.

(57) ABSTRACT

A method for forming a lithium-ion type battery including the steps of forming, over an at least locally conductive substrate, an insulating layer having a through opening; successively and conformally depositing a stack comprising a cathode collector layer, a cathode layer, an electrolyte layer, and an anode layer, this stack having a thickness smaller than the thickness of the insulating layer; forming, over the structure, an anode collector layer filling the space remaining in the opening; and planarizing the structure to expose the upper surface of the insulating layer.

31 Claims, 2 Drawing Sheets

METHOD FOR FORMING A THIN-FILM LITHIUM-ION BATTERY

CROSS REFERENCE TO RELATED APPLICATIONS

This application claims the priority benefit of French patent application number 09/56676, filed on Sep. 28, 2009, entitled "Method For Forming A Vertical Thin-Film Lithium-Ion Battery," which is hereby incorporated by reference to the maximum extent allowable by law.

BACKGROUND OF THE INVENTION

1. Field of the Invention

The present invention relates to a method for forming a vertical thin-film lithium-ion battery.

2. Discussion of the Related Art

Lithium-ion type batteries have the advantage of comprising a solid non-flammable electrolyte, which further has a good ion conductivity over a wide range of temperatures. Such batteries could advantageously be used in mobile electronic devices such as cell phones or laptop computers.

To form thin-film lithium-ion batteries, typically batteries having dimensions smaller than 2.5×2.5 cm, techniques of sputtering through a shadow mask are commonly used. Such techniques comprise placing a shadow mask above a support or substrate and sputtering, through this mask, the different layers forming the battery.

However, for a large-scale production of thin-film lithium-ion type batteries, the use of shadow masks is relatively expensive. Indeed, for each sputtering involving a mask, the sputtered component also deposits on the mask. Thus, between each use of the mask, the different layers deposited on the mask need to be removed and recycled.

Techniques of battery forming by sputtering through a shadow mask also have the disadvantage of not being adapted to form batteries of smaller dimensions (below a 3-mm side length), mask alignment problems appearing for such dimensions. Now, such batteries could advantageously be used as backup batteries to save key data in memories in the occurrence of a failure of a main battery.

To form small lithium-ion type batteries, it could be considered to adapt lithography techniques, which are well known and controlled in the field of integrated circuits. However, such techniques are relatively expensive when applied over large substrate surface areas. Further, lithography methods require the use of resins which are removed by wet processings (generally, solvent-based aqueous mixtures) which would cause chemical reactions with the highly reactive lithium-based battery layers. The implementation of such techniques is thus complex for the manufacturing of lithium-ion type batteries.

There thus is a need for a method enabling to form relatively inexpensive lithium-ion type batteries in thin film technology, adapted to the presence of the highly reactive materials forming such batteries.

SUMMARY OF THE INVENTION

An object of an embodiment of the present invention is to provide a method enabling to form a vertical thin-film lithium-ion type battery, compatible with the reactivity of the materials present in such batteries.

Another object of an embodiment of the present invention is to provide a method for forming small vertical thin-film lithium-ion type batteries at a reasonable cost.

Thus, an embodiment of the present invention provides a method for forming a lithium-ion type battery comprising the steps of: (a) forming, over an at least locally conductive substrate, an insulating layer comprising a through opening; (b) successively and conformally depositing a stack comprising a cathode collector layer, a cathode layer, an electrolyte layer, and an anode layer, this stack having a thickness smaller than the thickness of the insulating layer; (c) forming, over the structure, an anode collector layer filling the space remaining in the opening; and (d) planarizing the structure to expose the upper surface of the insulating layer.

According to an embodiment of the present invention, the method further comprises, after step (d), steps of forming of at least one protection layer over the structure, of an opening in said protection layer above the anode collector layer, and of a conductive region in the opening of the protection layer and above a portion of the protection layer.

According to an embodiment of the present invention, the method further comprises a step of forming of a first contact on the conductive layer and of a second contact on the substrate.

According to an embodiment of the present invention, the method further comprises, before step (c), a step of forming of a seed layer.

According to an embodiment of the present invention, the anode collector layer is formed by electrolytic growth at low temperature on the seed layer, the seed layer being formed of a stack of titanium and copper.

According to an embodiment of the present invention, the substrate is made of doped silicon or metal, the cathode collector layer is made of titanium, tungsten, molybdenum, tantalum, platinum, or of an alloy or a stack of these materials, the cathode layer is made of titanium lithium oxysulfide (LiTiOS), of cobalt lithium oxide ($LiCoO_2$), or of any material capable of inserting lithium, the electrolyte layer is made of lithium phosphorus oxynitride (LiPON), the anode layer is made of silicon, germanium, carbon, or a stack or an alloy of these materials, and the anode collector layer is made of copper.

According to an embodiment of the present invention, the cathode collector layer, the cathode layer, the electrolyte layer, and the anode layer are formed by physical vapor deposition (PVD).

According to an embodiment of the present invention, the protection layer is formed of a stack of a first layer made of ceramic, $Al_2O_3$, SiN, or $ZrO_2$, and of a second $SiO_2$ layer.

According to an embodiment of the present invention, the insulating layer has a thickness ranging between 5 and 30 μm, the cathode collector layer has a thickness ranging between 100 and 500 nm, the cathode layer has a thickness ranging between 1 and 10 μm, the electrolyte layer has a thickness ranging between 1 and 3 μm, and the anode layer has a thickness ranging between 10 and 800 nm.

An embodiment of the present invention further provides a lithium-ion type battery, comprising: an at least locally conductive substrate, supporting an insulating layer comprising a first through opening and, along the walls and the bottom of the opening, a stack of a cathode collector layer, of a cathode layer, of an electrolyte layer, of an anode layer, and of an anode collector layer, the stack filling the first opening.

BRIEF DESCRIPTION OF THE DRAWINGS

The foregoing objects, features, and advantages of the present invention will be discussed in detail in the following non-limiting description of specific embodiments in connection with the accompanying drawings, among which FIGS. 1 to 7 illustrate results of steps of a method according to an embodiment of the present invention.

DETAILED DESCRIPTION

Figure 1:
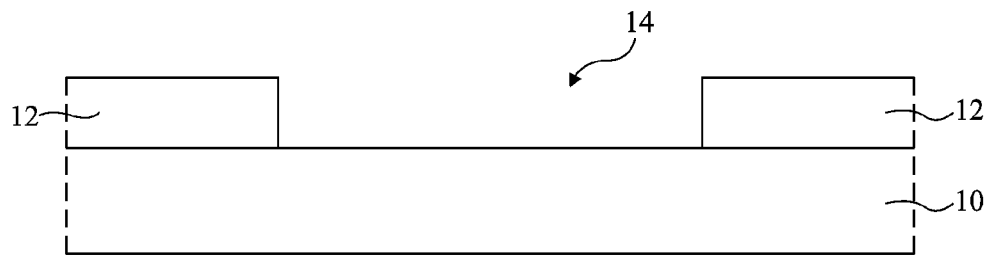

For clarity, the same elements have been designated with the same reference numerals in the different drawings and, further, as usual in the representation of small thin-film components, the various drawings are not to scale.

FIGS. 1 to 7 illustrate results of steps of a method for forming a lithium-ion type battery.

At the step illustrated in FIG. 1, it is started from a structure comprising a conductive substrate 10, on which a layer 12 of insulating material is formed. An opening 14 is made in the insulating material layer across its entire thickness. As an example, substrate 10 may have a thickness ranging between 500 and 800 μm and may be made of doped silicon or of a metal. Insulating layer 12 may be made of silicon oxide.

To obtain this structure, an insulating layer may be deposited all over conductive substrate 10, after which this layer may be etched by lithography to create opening 14, by means of a resin in which an adapted pattern is previously formed. Preferably, the oxide layer has a thickness ranging between 5 and 30 μm.

It should be noted that, in FIG. 1 and in the following drawings, a single elementary cell forming a lithium-ion type battery is shown. It should be understood that many batteries may be formed next to one another on substrate 10. Insulating regions 12 enable, among others, to delimit the different elementary batteries. As an example, the active regions of two adjacent batteries may be separated by a distance smaller than 1 mm, for example, ranging between 200 and 500 μm. It should be noted that the scribe line between two elementary batteries may be shorter than 100 μm.

Figure 2:
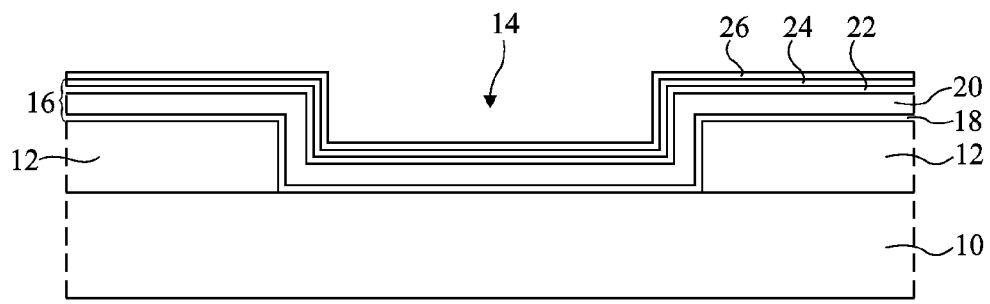

At the step illustrated in FIG. 2, a stack 16 of the different layers forming a lithium-ion type battery is formed on the device of FIG. 1, on the upper surface and on the walls of insulating portions 12, and on the apparent surface of conductive substrate 10. Stack 16 may be formed by a succession of physical vapor depositions (PVD).

Stack 14 comprises the following layers.

A first layer 18 forming a cathode collector. This layer may be, as an example, made of titanium, tungsten, molybdenum, tantalum, platinum, or an alloy or a stack of these materials and have a thickness ranging between 100 and 500 nm.

A second layer 20 forming the battery cathode, made of a material such as LiTiOS (titanium lithium oxysulfide), $LiCoO_2$ (cobalt lithium oxide), or $LiFePO_4$ (lithium iron phosphate), having a thickness ranging between 1 and 10 μm. More generally, layer 20 may be made of any material for inserting lithium usable as a cathode in lithium-ion type batteries.

A third layer 22 forming the battery electrolyte, for example made of LiPON (lithium phosphorus oxynitride) or of any other material capable of forming a solid lithium-ion cell electrolyte. Third layer 22 has a thickness ranging between 1 and 3 μm.

A fourth layer 24 forming the battery anode, for example made of silicon, germanium, carbon, or a stack or an alloy of these materials. The fourth layer has a thickness ranging between 10 and 800 nm.

Thus, stack 16 of layers 18 to 24 forming the active portion of the lithium-ion type battery may have a thickness ranging between 5 and 15 μm, this thickness being smaller than the thickness of insulating layer 12.

A fifth layer 26 forming a seed layer for the anode collector is formed on stack 16. As an example, this layer may be formed of a stack of titanium and copper. This layer also forms a protective barrier for the lower layers of the stack, and mainly for layers 22 and 24 formed of particularly reactive lithium compounds. As an example, seed layer 26 may have a thickness ranging between 100 and 300 nm. It should be noted that seed layer 26 may be omitted if the material forming the anode collector layer is capable of being directly formed on the battery anode.

Figure 3:
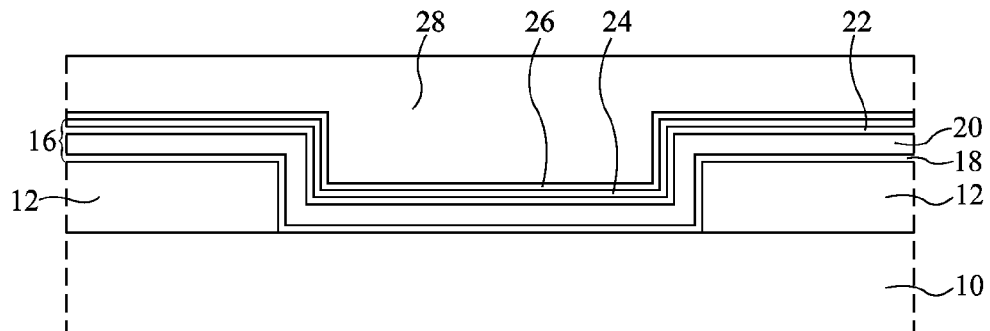

At the step illustrated in FIG. 3, an anode collector layer 28, for example, made of copper, has been formed by electrolytic growth at low temperature (to avoid causing reactions of layers made of lithium compounds), on seed layer 26. The electrolytic growth is provided so that copper 28 completely fills the space remaining in opening 14 and also forms at the surface of the portions of layer 26 located above insulating regions 12.

Figure 4:
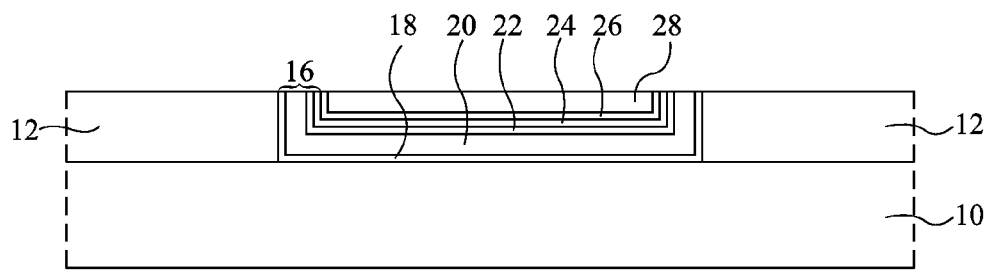

At the step illustrated in FIG. 4, a planarization or polishing of the structure of FIG. 3 has been performed to remove all the layers located above the upper surface of the portions of insulating material 12 and thus expose this insulating material.

To perform this planarization, any known chem.-mech. polishing (CMP) or purely mechanical method may be used. Further, to remove the different layers of stack 16, different types of planarization slurry may be successively used. To avoid any reaction of the materials of layers 20 and 22, non-aqueous slurry will be used.

Figure 5:
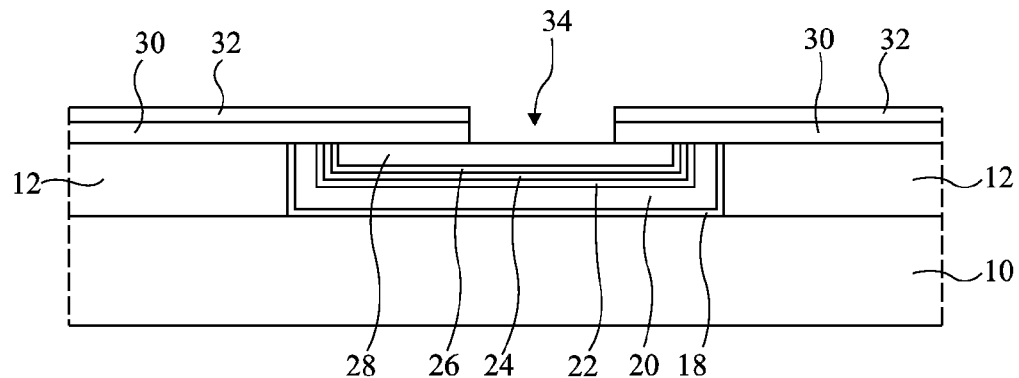

At the step illustrated in FIG. 5, an insulating protection layer has been formed over the entire device. In the illustrated example, this protection is formed of a stack of two layers 30 and 32. Stack 30/32 is in charge of protecting the portions of reactive material of stack 16 which are, at the step of FIG. 4, in contact with air (layers 20 and 22). For this purpose, first layer 30 deposited over the entire structure may be a ceramic, $Al_2O_3$, SiN, $ZrO_2$, or any other material likely to form a barrier against humidity and the diffusion of lithium. Layer 32 is a passivation layer which enables to complete the first humidity barrier level provided by layer 30, without necessarily being a barrier against the diffusion of lithium. As an example, layer 32 may be made of $SiO_2$. Preferably, layer 30 has a thickness of a few tens of nanometers and layer 32 has a thickness on the order of 1 μm.

An opening 34 is formed in stack 30/32 above a portion of anode collector layer 28. Preferably, opening 34 has a width ranging between 50 and 500 μm. Opening 34 enables to make a contact on anode collector layer 28. As an example, opening 34 may be formed by lithography, the use of such a method being made possible due to the presence of stack 30/32 for protecting the active battery layers.

Figure 6:
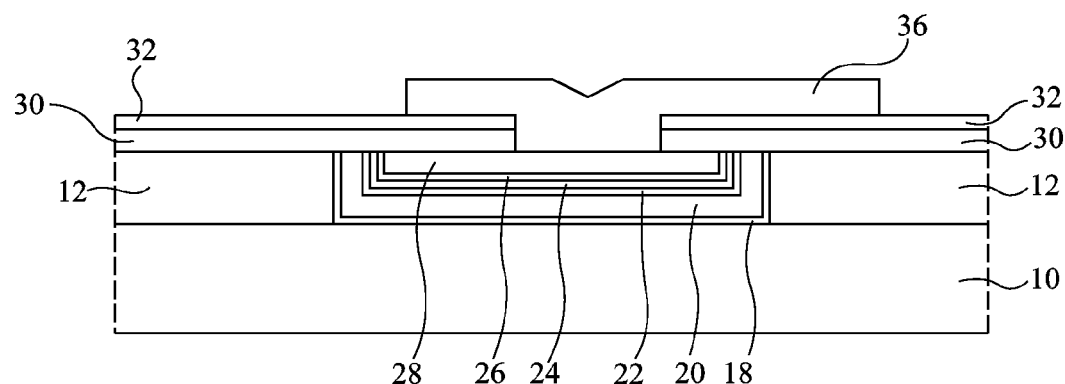

At the step illustrated in FIG. 6, a metallization 36 has been formed at the level of opening 34 and on a region of stack 30/32. Metallization 36 forms a contacting area on anode collector region 28. As an example, metallization 36 may be formed by a full plate deposition of a metal or conductive layer, followed by an etching of this layer as appropriate. Metallization 36 may be formed of a stack of aluminum and tantalum, of aluminum and titanium, or yet of aluminum and tantalum nitride.

Figure 7:
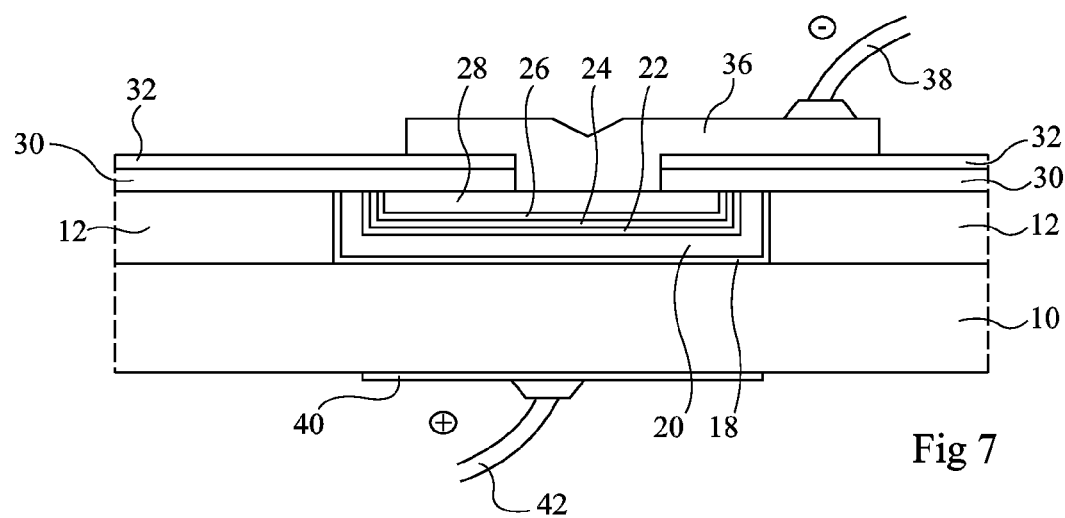

At the step illustrated in FIG. 7, the device of FIG. 6 has been encapsulated (not shown) and contacts have been formed on either side of the battery. As an example, the encapsulation may be performed by depositing, over the entire structure, a stack of silicon oxide and of silicon nitride, BCB, a polymerizable resist, etc. An opening (not shown) is then formed in the encapsulation layer to enable the forming of a first contact 38 on metallization layer 36 (anode contact). Contact 38 may be formed on metallization 36 by any known method, for example, a wire bonding type method.

A second contact, for the cathode, is formed on the lower surface of substrate 10, in front of the stack of layers 18 to 28. For example, a conductive region 40 may be formed on the lower surface of substrate 10 and a wire 42 may be welded on conductive region 40. It should be noted that, as a variation, the lower contact may also be formed by placing the battery on a support at the surface of which are formed conductive tracks.

A vertical lithium-ion type elementary battery, formed in thin films, is thus obtained. A step of dicing of the elementary batteries is then carried out. Advantageously, the method disclosed herein provides a sequence of steps performed at low temperature (below 300° C.), which is compatible with the presence of layers of reactive lithium compound materials and avoids the degradation of these materials.

Specific embodiments of the present invention have been described. Various alterations and modifications will occur to those skilled in the art. In particular, it should be noted that the initial structure of FIG. 1 may also be obtained by forming of a trench in the insulating substrate which will be made locally conductive, at the trench level, to enable the forming of contact 40 on the rear surface of the substrate.

Further, the materials used to form the active stack of the battery may be different from those mentioned hereabove, that is, any known material enabling to form thin-film lithium-ion type batteries.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for forming a battery comprising:
    forming, over a substrate, an insulating layer comprising an opening;
    successively and conformally depositing a stack onto the insulating layer and the opening, the stack comprising a cathode collector layer, a cathode layer, an electrolyte layer, and an anode layer, the stack having a thickness within the opening that is smaller than a thickness of the insulating layer; and
    forming, over the stack, an anode collector layer in the opening.

2. The method of claim 1, further comprising planarizing the stack and the anode collector layer to expose the upper surface of the insulating layer.

3. The method of claim 2, further comprising forming at least one protection layer over the insulating layer, the stack and the anode collector layer.

4. The method of claim 3, further comprising:
    defining an opening in said protection layer above the anode collector layer; and
    forming a conductive region in the opening of the protection layer.

5. The method of claim 4, further comprising forming a first contact on the conductive region and a second contact on the substrate.

6. The method of claim 4, wherein defining an opening in said protection layer comprises defining an opening having a width ranging from about 50 μm to about 500 μm.

7. The method of claim 4, wherein forming the conductive region comprises forming a conductive region with a stack of aluminum and tantalum, of aluminum and titanium, or of aluminum and tantalum nitride.

8. The method of claim 3, wherein forming a protection layer over the insulating layer, the stack and the anode collector layer comprises forming a first layer made of ceramic, $Al_2O_3$, SiN, or $ZrO_2$, and a second layer made of $SiO_2$.

9. The method of claim 1, further comprising, before forming, over the stack, an anode collector layer, forming a seed layer.

10. The method of claim 9, wherein forming, over the stack, the anode collector layer comprises forming, over the stack, the anode collector layer by electrolytic growth at low temperature.

11. The method of claim 9, wherein forming the seed layer comprises forming a stack of titanium and copper.

12. The method of claim 1, wherein forming the insulating layer over a substrate comprises forming the insulating layer over a substrate made of doped silicon or metal.

13. The method of claim 1, wherein depositing the stack comprising a cathode collector layer, a cathode layer, an electrolyte layer, and an anode layer comprises forming the cathode collector layer, the cathode layer, the electrolyte layer, and the anode layer by physical vapor deposition.

14. The method of claim 1, wherein forming, over a substrate, an insulating layer comprises forming, over a substrate, an insulating layer having a thickness ranging between 5 and 30 μm.

15. The method of claim 1, wherein forming, over a substrate, an insulating layer, comprises forming an insulating layer over an at least locally conductive substrate.

16. The method of claim 1, wherein forming, over a substrate, an insulating layer comprising an opening comprises forming, over a substrate, an insulating layer comprising a through opening.

17. The method of claim 1, wherein forming, over the stack, an anode collector layer in the opening comprises forming, over the stack, an anode collector layer completely filling the opening.

18. The method of claim 1, wherein successively and conformally depositing a stack comprising a cathode collector layer comprises successively and conformally depositing a stack comprising a cathode collector layer made of titanium, tungsten, molybdenum, tantalum, platinum, or of an alloy or a stack of these materials.

19. The method of claim 1 wherein successively and conformally depositing a stack comprising a cathode layer comprises successively and conformally depositing a stack comprising a cathode layer made of titanium lithium oxysulfide, of cobalt lithium oxide, or of any material capable of inserting lithium.

20. The method of claim 1, wherein successively and conformally depositing a stack comprising an electrolyte layer comprises successively and conformally depositing a stack comprising an electrolyte layer made of lithium phosphorus oxynitride.

21. The method of claim 1, wherein successively and conformally depositing a stack comprising an anode layer comprises successively and conformally depositing a stack comprising an anode layer made of silicon, germanium, carbon, or an alloy or a stack of these materials.

22. The method of claim 1, wherein successively and conformally depositing a stack comprising an anode collector layer comprises successively and conformally depositing a stack comprising an anode collector layer made of copper.

23. The method of claim 1, wherein successively and conformally depositing a stack comprising a cathode collector layer comprises forming a cathode collector layer having a thickness ranging between 100 and 500 nm.

24. The method of claim 1, wherein successively and conformally depositing a stack comprising a cathode layer comprises forming a cathode layer having a thickness ranging between 1 and 10 µm.

25. The method of claim 1, wherein successively and conformally depositing a stack comprising an electrolyte layer comprises forming an electrolyte layer having a thickness ranging between 1 and 3 µm.

26. The method of claim 1, wherein successively and conformally depositing a stack comprising an anode layer comprises forming an anode layer having a thickness ranging between 10 and 800 nm.

27. A method for forming a battery comprising:

providing an insulating layer disposed on a substrate, wherein the insulating layer includes an opening;

depositing a stack in the opening, wherein the stack comprises a first collector layer, a cathode layer, an electrolyte layer, and an anode layer, wherein the stack has a thickness within the opening that is smaller than a thickness of the insulating layer; and forming a second collector layer over the stack.

28. The method of claim 27 further comprising planarizing the stack and the second collector layer to expose the upper surface of the insulating layer.

29. The method of claim 27, wherein forming the second collector layer over the stack comprises filling the opening with the second collector layer.

30. The method of claim 27, wherein the opening is a through opening in the insulating layer.

31. The method of claim 27, wherein the opening in the insulating layer is associated with a portion of the substrate that is at least locally conductive.

* * * * *

UNITED STATES PATENT AND TRADEMARK OFFICE
CERTIFICATE OF CORRECTION

PATENT NO.        : 8,784,511 B2                                     Page 1 of 1
APPLICATION NO.   : 12/877344
DATED             : July 22, 2014
INVENTOR(S)       : Pierre Bouillon It is certified that error appears in the above-identified patent and that said Letters Patent is hereby corrected as shown below:

In the Specification:

In Column 2, Line 38, "anode" should read --cathode--.

Signed and Sealed this
Fourteenth Day of October, 2014

Michelle K. Lee
*Deputy Director of the United States Patent and Trademark Office*